United States Patent [19]

Huang

[11] Patent Number: 5,184,835
[45] Date of Patent: Feb. 9, 1993

[54] HANDLE HEIGHT ADJUSTER FOR BABY CARRIAGE

[75] Inventor: Mien-Cheng Huang, Tainan, Taiwan

[73] Assignee: Taiwan Charwell Enterprise Co., Ltd., Tainan, Taiwan

[21] Appl. No.: 871,717

[22] Filed: Apr. 21, 1992

[51] Int. Cl.⁵ ................................................ B62B 9/20
[52] U.S. Cl. ..................... 280/47.371; 16/111 R; 403/109; 280/642; 280/47.38; 280/655.1
[58] Field of Search ............ 280/47.371, 47.38, 655.1, 280/647, 658, 642; 16/111 R, 111 A; 403/108, 109; 74/551.3

[56] References Cited

U.S. PATENT DOCUMENTS

| | | | |
|---|---|---|---|
| 4,924,725 | 5/1990 | Takahashi et al. | 280/47.371 |
| 5,056,805 | 10/1991 | Wang | 280/47.371 |
| 5,062,179 | 11/1991 | Huang | 280/47.371 |

Primary Examiner—David M. Mitchell
Attorney, Agent, or Firm—Morton J. Rosenberg; David I. Klein

[57] ABSTRACT

A handle height adjuster for a baby carriage has a hollow connecting rod for a main rod of a baby carriage to fit movably in an inner passageway in the connecting rod. The main rod can be pulled up or down to raise or lower the height adjuster connected with two ends of the handle of the baby carriage and kept securely at the raised or the lowered height by an insert block sandwiched in a push block and an actuating plate. The insert block can be moved horizontally to insert in one of engaging square holes in the main rod and a square hole in a side wall of the connecting rod with the connecting rod after the height adjuster is adjusted to a new height.

1 Claim, 6 Drawing Sheets

5,184,835

HANDLE HEIGHT ADJUSTER FOR BABY CARRIAGE

BACKGROUND OF THE INVENTION

A conventional baby carriage shown in FIG. 1 has a handle 1 shaped as U, a sun shade frame 11 combined with both sides of the handle 11 and a rear wheel supporting rod 12 combined with both bottom ends of the handle 1. But the length of the handle 1 and its angle is definite and unchangeable to suit the height of a user. So the baby carriage with such a handle is not so convenient to use.

Another conventional baby carriage has been improved a little to have an angle adjuster 3 shown in FIG. 2, which is combined with the handle 2 at the upper end and with a main rod 21 in a baby carriage. The angle adjuster 3 consists of a lower joint 31 and an upper joint 34, a spring 32, a gear 33 and a circular block 35 combined together. The lower joint 31 has a tooth ring 311 on the top. The upper joint 34 has an upper square portion and a lower circular portion extending down from the upper square portion. The spring 32, the gear 33 are mounted in the circular portion of the upper joint 34, and the upper square portion has an inner cavity for the lower end of the handle to fit firmly therein. The upper joint 34 can be adjusted in relation to the lower joint 31 so that the handle can be adjusted in its angle, but the height of the handle is not adjustable.

SUMMARY OF THE INVENTION

The handle height adjuster for a baby carriage improved in the present invention has the following features.

1. It is combined with an angle adjuster for a handle to be adjusted to be used by a person of any height.
2. It consists of as few components as could be and can be assembled together quickly to save cost and production work.
3. It adjustment is simple and quick.
4. It has enough structural stability.

The handle height adjuster in the present invention comprises a movable actuating plate combined with an insert block and a push block moving together with the movable actuating plate. These three components are mounted in a partition in a U-shaped plate fixed on a side wall of a connecting rod, and covered with a lid on the actuating plate. The actuating plate is usually in the low position, two sidewise projections in the insert block are kept in an upper portion of a slot defined by the side edges of the actuating plate and the push block, and the rear portion of the insert block is inserted in a square hole in a side wall of the connecting rod and one of several engaging square holes in a side wall of a main rod of a baby carriage. A securing pin inserts through the actuating plate, the insert block, the push block, the connecting rod and the main rod. Then the handle and the main rod are kept securely at a certain height chosen.

If the actuating plate is moved up from the low position described just above to the high position with the fingers the insert block can be moved horizontally forward (to the right side) by means of the two sidewise projections moving along the two slots defined by the curved side edges of the actuating plate and the push block so that the rear portion of the insert block leaves one of the engaging holes in the main rod. Then the main rod can be pulled up or down, in other words, to heighten or lower the height the handle. Then the actuating plate is moved down with the fingers to the low position, letting the insert block move horizontally rearward (to the left) to have the rear portion thereof insert in the square hole in the connecting rod and another of the engaging holes in the main rod again so that the height adjuster keeps the handle and the main rod secure and immovable at the newly adjusted height.

BRIEF DESCRIPTION OF DRAWINGS

The invention will be better understood by reference to the accompanying drawings, wherein.

DETAILED DESCRIPTION OF THE PREFERRED EMBODIMENTS

Figure 1:
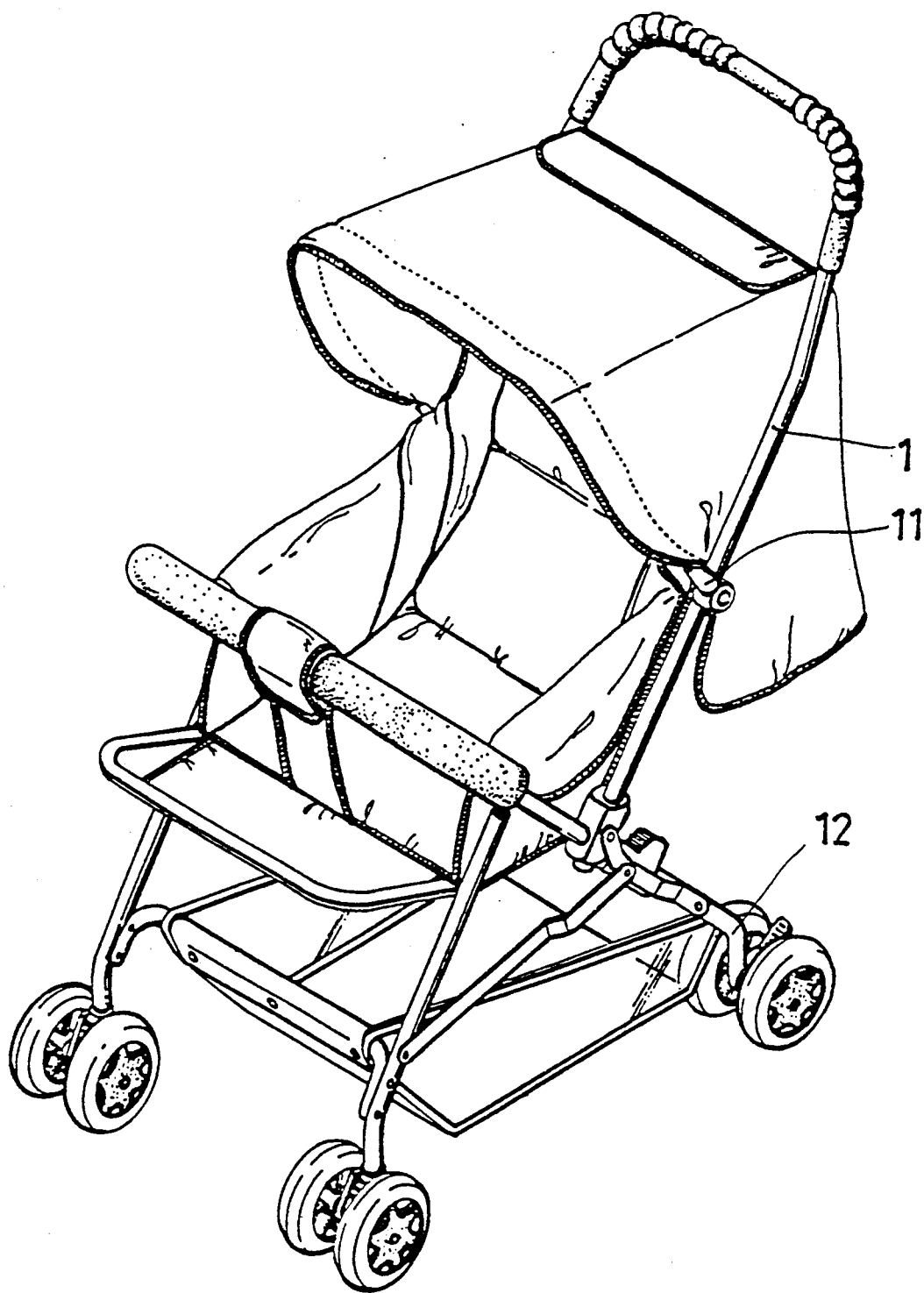
FIG. 1 is a perspective view of a conventional baby carriage.
Figure 2:
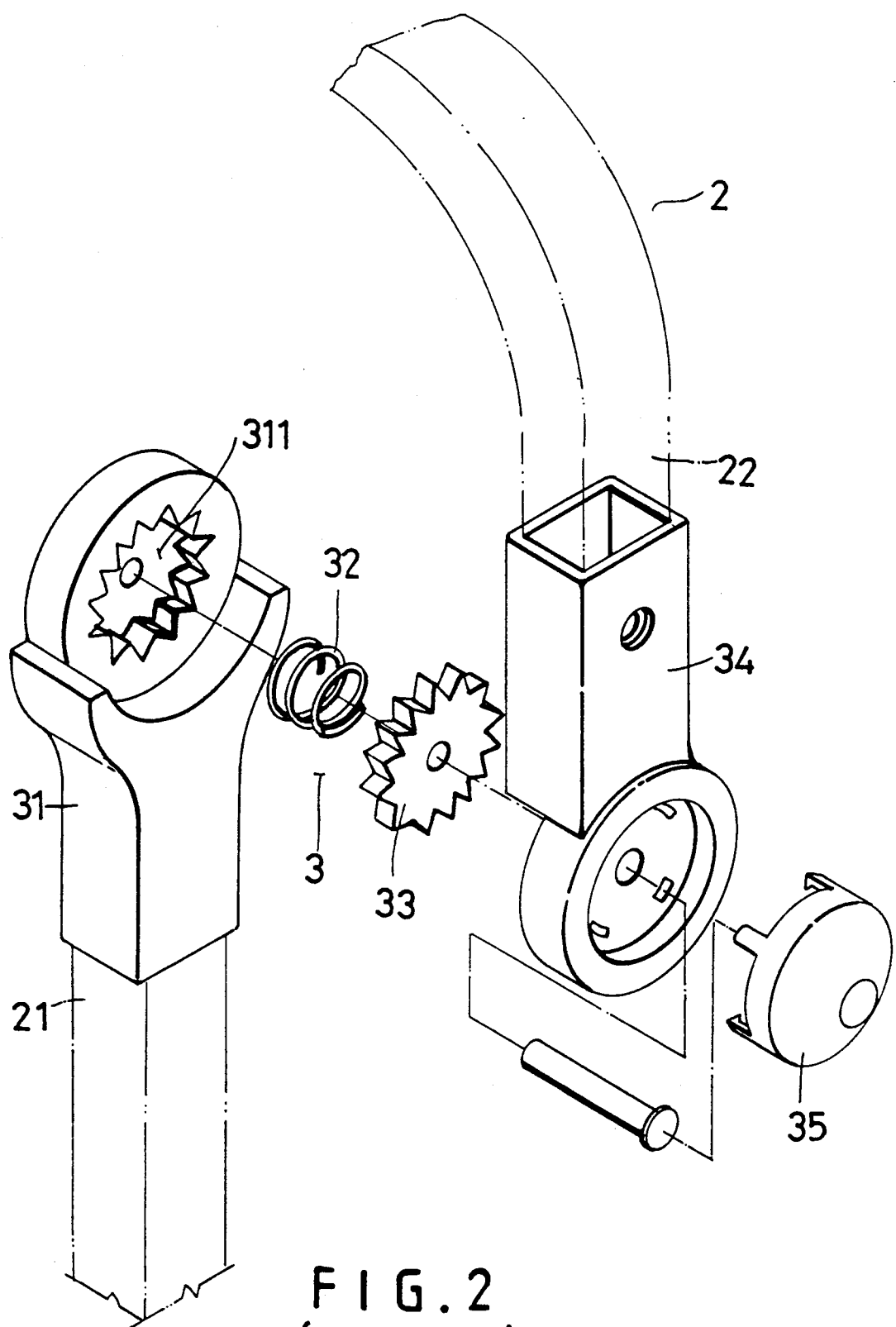
FIG. 2 is an exploded perspective view of an angle adjuster in a handle in a conventional baby carriage.
Figure 3:
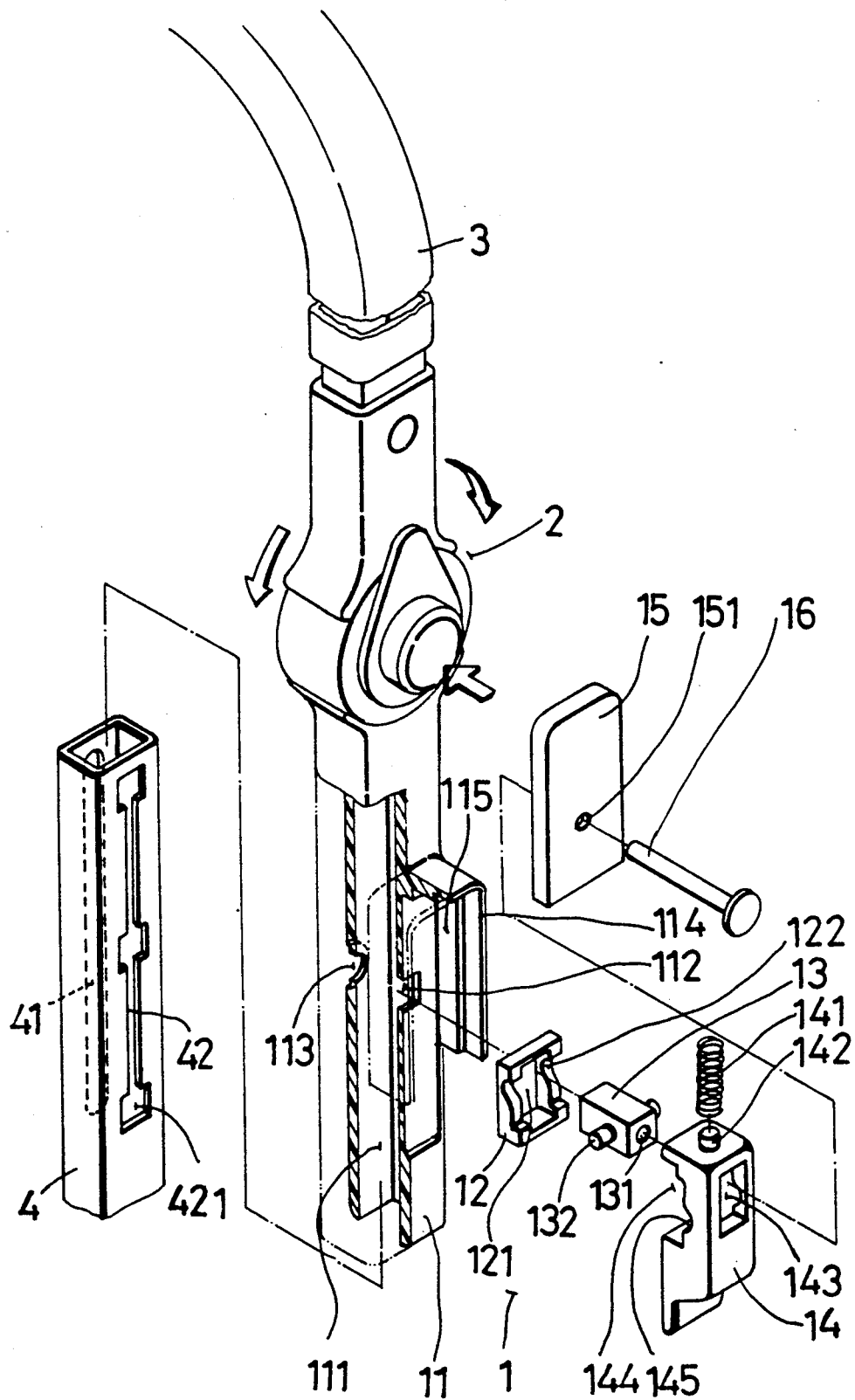
FIG. 3 is an exploded perspective view of the handle height adjuster in a baby carriage in the present invention.
Figure 4:
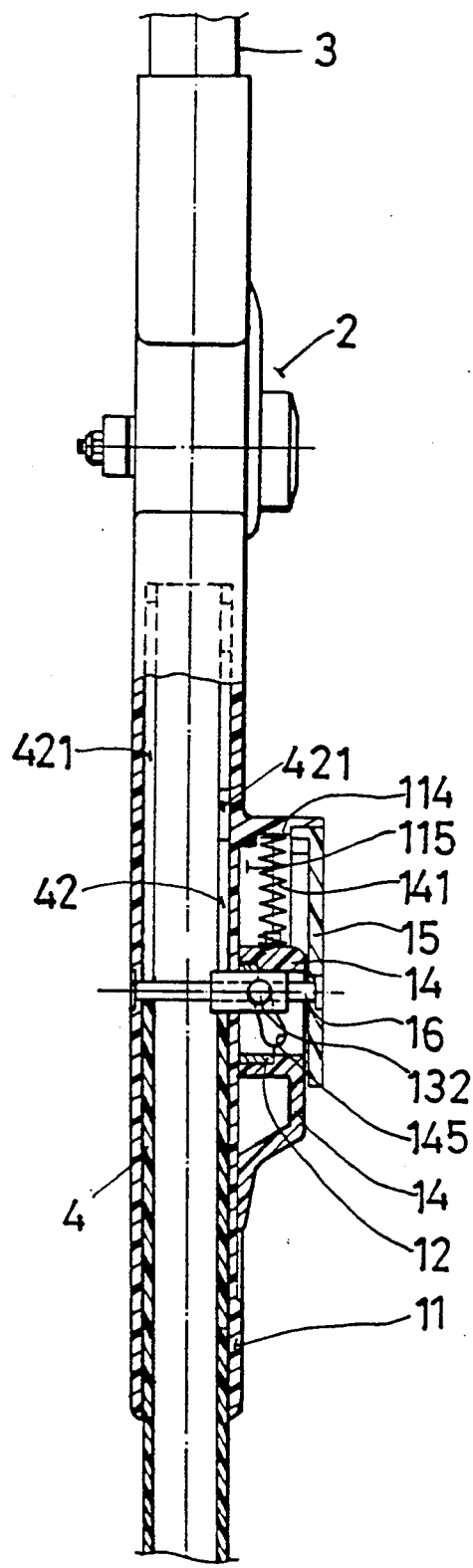
FIG. 4 is a cross-sectional view of the handle height adjuster in a baby carriage in the present invention.

The handle height adjuster for a baby carriage in the present invention, as shown in FIG. 3, comprises a height adjuster 1, an angle adjuster 2, a handle 3 as its main components, being combined with a main rod of a baby carriage.

The height adjuster 1 has a connecting rod 11, an L-shaped push block 12, an insert block 13, an actuating plate 14, a lid 15 and a securing pin 16. The connecting rod 11 has an inner lengthwise passageway 111 for the main rod 4 to fit movably therein a square hole 112 and a round hole bored in two opposite walls, a U-shaped plate 114 projecting from the right side wall and an inner partition 115 formed in the U-shaped plate 114. The L-shaped push block 12 has an opening 121 and two curved edges 122, 122 in two opposite sides and is mounted in the partition 115 in the U-shaped plate 114, resting on the inner wall surface. The insert block 13 has two projecting pins 132 extending-out sidewise from two opposite sides and a through hole 131, being inserted in the opening 121 in the push block 12, with two projecting pins 132, 132 resting on the curved edges 122, 122 in the push block 12. The actuating plate 14 is shaped nearly as P, having a projection 142 on the upper surface for a coil spring 141 to sit around, an horizontal opening 143, an inner cavity 144 for the push block 131 to fit through, and two curved edges 145, 145 on two opposite walls. A lid 15 has a hole 151 for a securing pin 16 to pass through, closing the partition 115 in the connecting rod 11 after the push block 12, the insert block 13 and the actuating plate 14 are all fitted in the partition 115, and the securing pin 16 passes through the hole 151, the opening 143 in the actuating plate 14, the through hole 131 in the insert block 13 and the opening 121 in the push block 12, positioning those components 14, 13, 12 securely in the partition 115.

The main rod 4 is a square empty rod, having an elongate slot 41 in one side wall, an elongate slot 42 added with several equally spaced-apart square inserting holes 421 on the slot 42 in the opposite side wall, and a long upper portion to fit movably in the inner passageway 111 in the connecting rod 11.

In assembling this adjuster, the main rod 4 is first inserted in the inner passageway 111 in the connecting rod 11, and then the push block 12 and the insert block 13 inserted in the opening 121 in the block 12 are inserted in the partition 115 and then the insert block 13 is moved to protrude through one of the engaging square holes 421 in the main rod 4 and the square hole 112 in the connecting rod 11 so that the main rod 4 may be kept immovable in place. And next, the actuating plate 14 is to be placed in the partition 115, surrounding the insert block 13, with the top of the coil spring 141 pushing against the inner top of the U-shaped plate 114. And lastly, the lid 15 is closed on the partition 151, and the securing pin 16 is inserted through the hole 151, the thorough hole 131 and the opening 113, and then the lid 15 is rivetted firmly.

Figure 5:
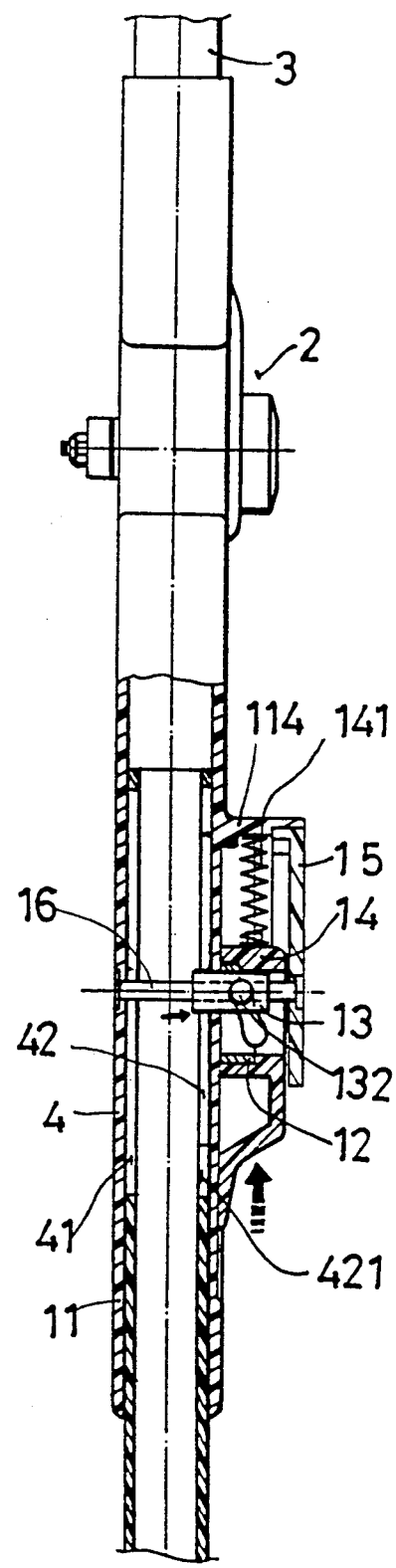
FIG. 5 is a cross-sectional view of the handle height adjuster being operated in a baby carriage in the present invention.
Figure 6:
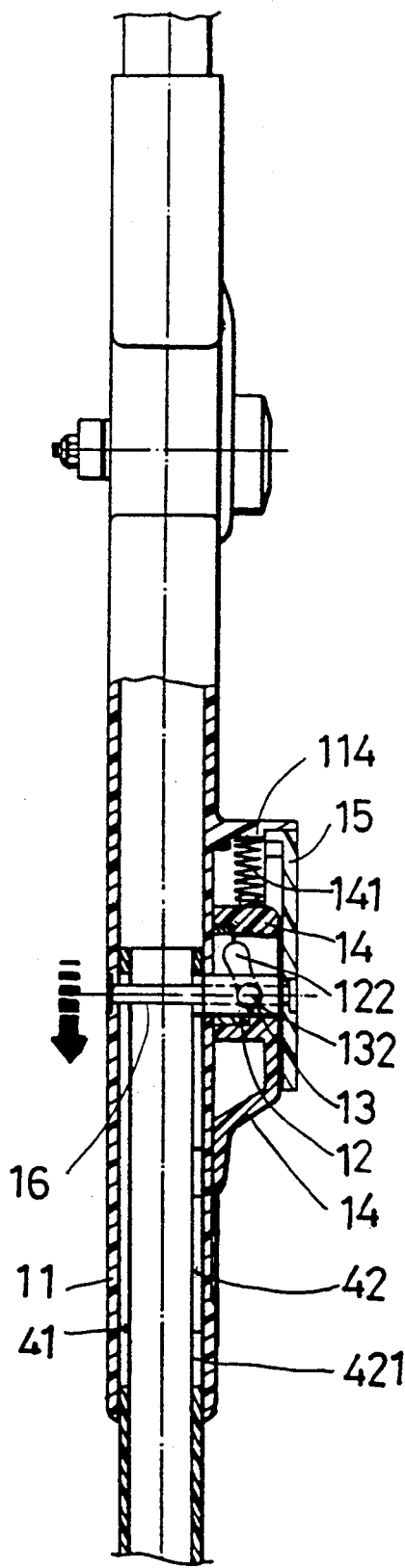
FIG. 6 is a cross-sectional view of the handle height adjuster not kept secured in a baby carriage in the present invention.
Figure 7:
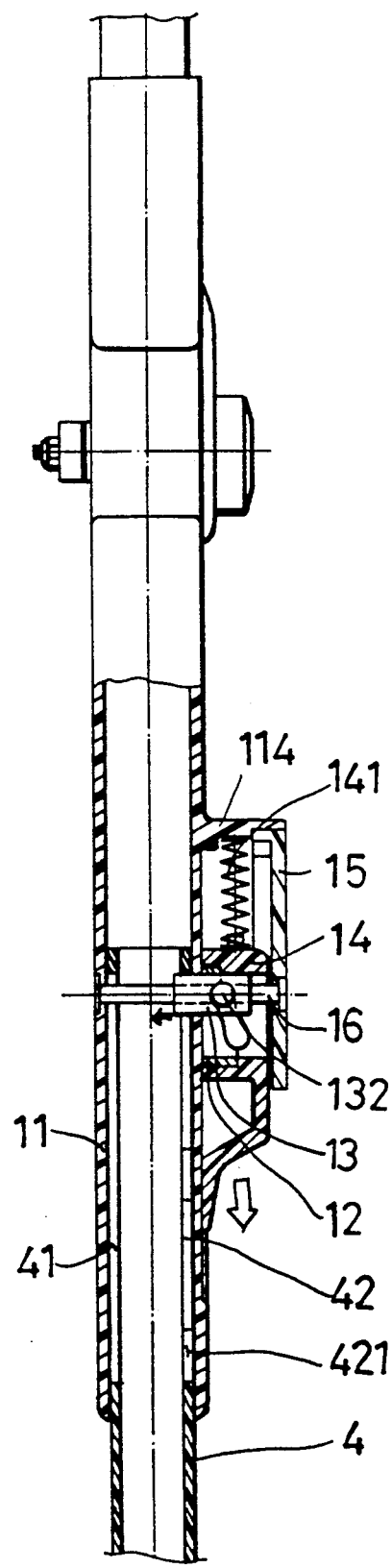
FIG. 7 is a cross-sectional view of the handle height adjuster operated and kept secured in a baby carriage in the present invention; and, FIG. 8 is a perspective view of the handle provided with the handle height adjuster assembled in a baby carriage in the present invention.
Figure 8:
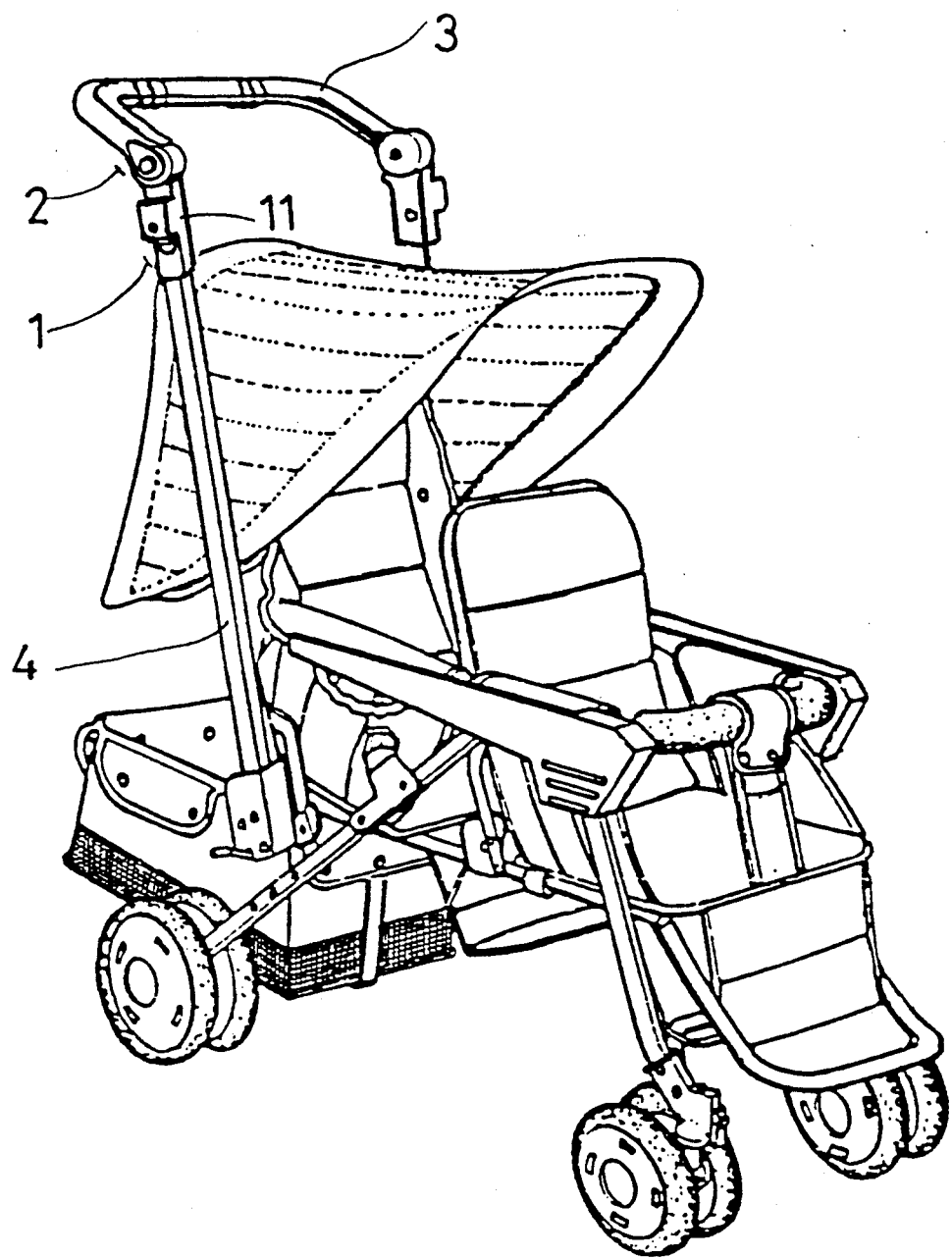

The operation of this adjuster is described now. When a user wants to adjust the height of the handle, he pushes up the actuating plate 14 from the low position shown in FIG. 5 to the hight position shown in FIG. 6. Then the insert block 13 moves horizontally by means of the projecting pins 132, 132 sliding along the curved edges 145, 145 to sit in the deepest spot in the edges 145, 145. So the insert block 13 moves to the right, leaving one of the engaging square holes 131 in the main rod 4 with the securing pin 16 as a shaft. Now, the handle 3 together with the height adjuster is to be pulled up or down to a proper height, and releasing the actuating plate 14 can permit the actuating plate 14 to move down to the low position shown in FIG. 7 or 5, and the insert block 13 moves back to insert in another of the engaging holes 421 newly selected, keeping the handle 3 at a new height chosen.

While the preferred embodiments of the invention have been described above, it will be recognized and understood that various modifications may be made therein and the appended claims are intended to cover all such modifications which may fall within the spirit and scope of the invention.

What is claimed is:

1. A handle height adjuster for a baby carriage having its upper portion combined with an angle adjuster and its lower portion combined with a main rod of a baby carriage, comprising:

a connecting rod having an inner lengthwise passageway for the main rod to movably fitting therein, a round hole and a square hole respectively bored in two opposite side walls, and a top end connected with the angle adjuster;

a U-shaped plate fixed on the side wall bored with the square hole in the connecting rod, said U-shaped plate having an inner partition wherein an L-shaped push block fits;

said L-shaped push block having a rectangular opening in its vertical wall and two curved edges on two opposite sides;

an insert block having a square cross-section, a horizontal through hole and two projecting pins extending-out sidewise from two opposite sides;

an actuating plate shaped nearly as P, having a projection on the top surface for securing the bottom end of a coil spring, a through hole in the front vertical wall and an inner cavity for said push block to fit therein and two curved edges on two opposite side walls defining the inner cavity;

a lid to cover said actuating plate, keeping said push block, said insert block and the actuating plate secured in the inner partition in said U-shaped plate with said pins on said insert block bearing between said curved edges of the l-shaped push block and the curved edges of said actuating plate and having a through hole for a securing pin to pass through, said pin also passing through the through hole in said actuating plate, the through hole in said insert block, the opening in said push block, the square hole in the connecting rod and two slots in two opposite walls of a main rod;

said main rod of a baby carriage having a hollow square cross-section, an elongate slot on one side and an elongate slot with a plurality of engaging square holes spaced apart on the slot on the opposite side, movably inserted in the inner passageway in said connecting rod; and, said actuating plate being manually pushed up and down in the partition of said U-shaped plate moving horizontally forward and backward said insert block inserting in one of the engaging square holes in said main rod and in the square hole in the connecting rod, said insert block leaving one of the square holes in said main rod and inserting in any of said square holes in the main rod to firmly secure the main rod with the connecting rod after the main rod is pulled up or down in adjusting the height of the height adjuster.

* * * * *